Jan. 24, 1967  R. N. MARONA  3,300,099

METERING DISPENSER FOR LIQUIDS

Filed May 18, 1965

INVENTOR
ROBERT N. MARONA

BY LaFever Luellman & Hulbert
ATTORNEYS

United States Patent Office 3,300,099
Patented Jan. 24, 1967

3,300,099
METERING DISPENSER FOR LIQUIDS
Robert N. Marona, Scarsdale, N.Y., assignor to General Foods Corporation, White Plains, N.Y., a corporation of Delaware
Filed May 18, 1965, Ser. No. 456,676
12 Claims. (Cl. 222—207)

This invention relates generally to liquid dispensing devices adaptable for use as a closure member for a liquid container, the invention relating more particularly to such devices capable of dispensing, in response to manual actuation, different quantities of the contained liquid dependent upon the manner of actuation thereof.

There has long been a demand for a low-cost reliable dispensing device for liquids which could meter precise quantities of the liquid as desired. The demand for such devices keeps increasing as more and more new products in liquid form and in concentrated strength become available to the public at large for use in relatively small but accurately measured quantities.

The invention is herein disclosed in an embodiment designed to constitute an end closure for a liquid container intended to hold a concentrated relatively low-viscosity liquid such as an artificial sweetener or the like. Due to the wide range in taste among the public at large with respect to the degree of sweetness desired for any given food product, the dispensing device provided for use with such products should ideally be capable of operating to dispense as little as one drop of the product at a time or, alternatively, a stream comprising a quantity of the product equivalent to a predetermined number of drops. For example, in the case of a product of the type above mentioned, i.e., an artificial sweetener, the quantity of the product desired at any time may be equated with its equivalent amount of sugar. Assuming that the concentration of the product is such that ten drops thereof are the equivalent of one teaspoonful of sugar, then by proportioning the dimensions of the device so that when actuated in one manner ten drops of the product will be dispensed in a stream, the consumer can readily and easily obtain the equivalent of one teaspoon of sugar, or possibly two or three as the case may be. In the event that the consumer wished quantities other than those represented by full increments of ten drops each, the device could be actuated in a different manner to dispense one drop at a time thus enabling the consumer to obtain the precise quantity desired.

The embodiment of the invention disclosed herein is molded out of flexible material, preferably a plastic material such as polyethylene or the like, to form a semi-rigid structure having flexible, resilient characteristics. The structure comprises generally a bottle cap having a hollow annular base adapted for snap fitment with the finish of the associated container and an intercommunicating hollow tip portion or nozzle having a dispensing orifice and adapted for flexing to dispense the product through said orifice. The interior areas of said base and nozzle interconnect at a restricted throat which seals the connecting passage to render the nozzle interior a volumetric measuring chamber when the nozzle is flexed or bent relative to the base. The construction is such that the flexing or bending of the nozzle relative to the base always occurs at a predetermined location or flexure axis so that the measuring chamber will be of constant and uniform volume for every operation of the device. The nozzle of the device is designed to be compressed, to forcibly dispense the liquid product, incident to its manual flexure about said axis, the amount of product dispensed depending on the degree of manual force applied thereto, a light force dispensing one drop at a time and a greater force, causing maximum compression, being effective to dispense a stream of the product constituting a predetermined quantity thereof.

It is, therefore, an object of this invention to improve upon devices for dispensing from a container liquids in metered predetermined amounts.

It is a further object of this invention to provide a liquid metering dispenser which is simplified in design, economical to manufacture and reliable in operation.

Further objects of the invention, together with the features contributing thereto and the advantages accruing therefrom, will be apparent from the following description when read in conjunction with the drawing wherein.

Figure 1:
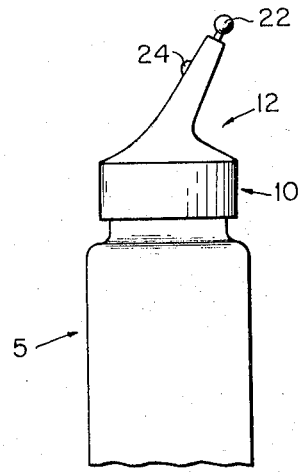
FIG. 1 is a view in side elevation of a liquid container with the metering dispenser according to the invention attached thereto.

Referring now to the drawing, FIG. 1 illustrates the device attached to the upper end of a liquid container in the form of a bottle 5, the device including an annular base 10 comprised of an upright circular wall 11 supporting an upstanding nozzle 12 the longitudinal axis of which is inclined and forms an acute angle with the axis of the base 10.

Figure 2:
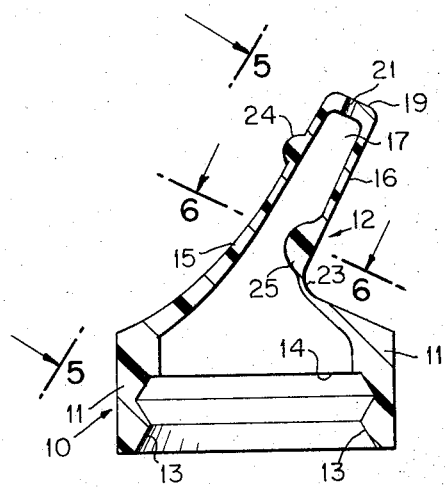
FIG. 2 is an enlarged side view in section of the dispenser shown separately from its associated container.

As can better be seen in FIG. 2, the interior surface of wall 11 is formed with an annular flange 13 and shoulder 14 adapted for a snap-fit engagement and providing a liquid-tight seal with an appropriately shaped finish on the associated container.

Figure 5:
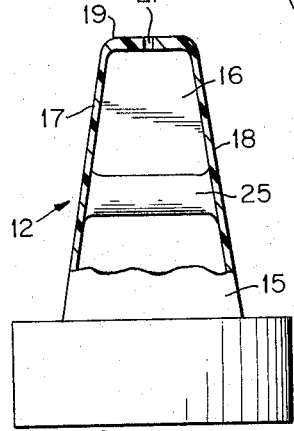
FIG. 5 is an elevational view, partly in section, of the device as shown in FIG. 2 viewed from the plane 5—5 of FIG. 2.

The nozzle 12 which represents a somewhat restricted continuation of the wall 11 of the base 10 is defined by top and bottom walls 15, 16, respectively, side walls 17, 18, respectively, see also FIG. 5, and an end wall 19. The end wall is provided with a dispensing orifice 21 which in the manufacture of the device is sealed by a snip-off tip 22, shown only in FIG. 1, it being understood that the tip 22 is a protective seal intended to be snipped or otherwise removed by the consumer in preparation for use of the device.

It will be noted that the top wall 15 of the nozzle, as seen in FIG. 2, extends along a gradual arc to its point of juncture with the wall 11 of base 10. The bottom wall 16 of the nozzle, however, is formed with a relatively sharp curve 23 as it extends to its point of juncture with the base portion wall 11. The apex of the curve 23 serves as a fixed flexure line or axis about which the nozzle will bend upon application of manual force thereto in dispensing the product in a manner to be hereinafter more fully described.

Figures 6, 7:
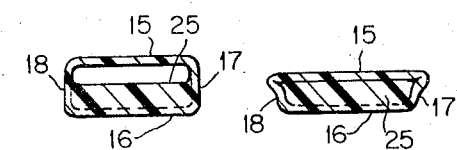
FIG. 6 is a sectional view taken at line 6—6 of FIG. 2.
FIG. 7 is a sectional view taken at line 7—7 of FIG. 3.

The portion of the nozzle 12 extending between the curve 23 and the end wall 19 is substantially rectangular in cross section, see also FIG. 6, and defines the volumetric measuring chamber for the liquid to be dispensed. Upon actuation of the device, the flexure of the nozzle portion constituting the volumetric measuring chamber is operative for sealing off the liquid therein contained from the liquid remaining in the base of the device and in the container or bottle to which it is attached so that the same amount of liquid will be dispensed each time that the device is actuated in the same manner regardless of the amount of the liquid remaining in the container. The device is actuated by manually pressing against the top wall 15 of the nozzle portion which defines the volumetric measuring chamber, the force of which pressing action causes the nozzle portion to bend about the flexure axis provided by the curve 23 in the bottom wall 16 as aforesaid. The bending of the nozzle portion at this point causes the top wall 15 to be brought into contact with the bottom wall 16 thus sealing off the measuring chamber from the base of the device. A small protrusion 24 may be formed on the exterior surface of the top wall to serve as an indicator or locator for identifying the preferred location or area on the nozzle at which manual force may be applied in actuating the device to dispense liquid from the container. The application of force on the protrusion 24 also tends to flex inwardly the top wall 15 to reduce the volume of the measuring chamber which action, after the measuring chamber has been sealed off from the base of the device, exerts a pressure on the liquid trapped within the measuring chamber to forcibly eject said liquid through the orifice 21. In order to assure that the initial action of the device upon application of the force is a bending of the nozzle at the flexure axis, the bottom wall of the nozzle at the curve 23 may be formed in reduced thickness relative to the other walls of the nozzle, thus inducing the bending of the nozzle to seal off the volumetric measuring chamber as aforesaid before any substantial inward flexing of the top wall 15 is achieved. Also, to minimize the degree of bending necessary to achieve a sealing off of the volumetric measuring chamber from the base of the device, the bottom wall 16 may be formed with an area just above the curve 23 of considerably increased thickness to constitute a sealing rib or flange 25 which extends across the bottom wall between side walls 16, 17 to define with the top wall 15 a restricted opening or throat between the volumetric measuring chamber and the interior of the base 10 of the device.

Figure 3:
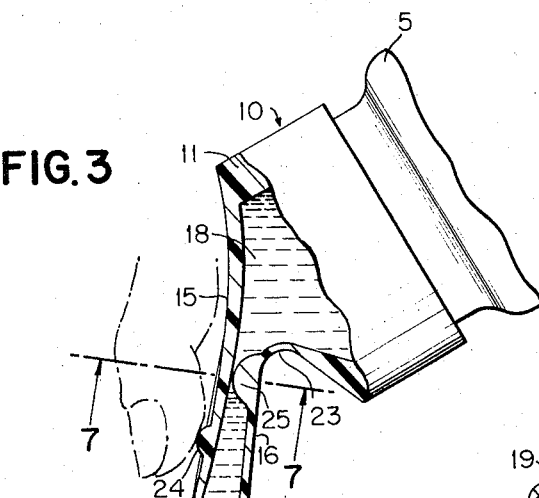
FIG. 3 is an operational view illustrating the drop-by-drop dispensing of the product by the device.

FIG. 3 illustrates the device actuated to dispense the contained liquid drop-by-drop. As shown in FIG. 3, a relatively light manual force applied on the protrusion 24 has caused the nozzle to bend about the flexure axis in the curve 23 of the bottom wall 16 so as to bring the top wall 15 into sealing contact with the flange 25, see also FIG. 7, to seal off or prevent communication between the volumetric measuring chamber in the forward end of the nozzle from the remaining interior area of the device and the associated container 5. The container is, of course, inverted at least to an extent where the contained liquid will fill the interior of the nozzle, and in so doing, the liquid will not flow or drip through the orifice 21 since the orifice is of such predetermined dimensions as to prevent product flow in the absence of pressure applied to the walls of the nozzle portion defining the measuring chamber. As can be seen in FIG. 7, the bending of the nozzle about the flexure axis, as aforementioned, is accompanied with a collapse of the side walls 18, 19 which fold over upon themselves and thus contribute to the sealing of the measuring chamber from the remainder of the container. In FIG. 3 the relatively light force applied on the nozzle portion has caused a slight inward flexure of the top wall 15. This, in turn, applies a slight pressure to the liquid within the volumetric measuring chamber causing same to be dispensed through the orifice 21 one drop at a time, the dispensing action continuing in this manner as long as a gradually increasing force is applied.

Figure 4:
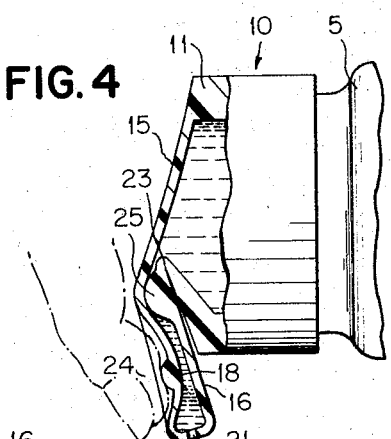
FIG. 4 is an operational view illustrating stream dispensing of a predetermined quantity of product.

FIG. 4 illustrates the action of the device in dispensing a stream of the contained liquid in a predetermined amount. In this instance, a relatively greater force has been applied causing the nozzle to bend about the flexure axis to the maximum extent wherein the bottom wall 16 is doubled back upon itself and limits against the thick, relatively inflexible wall 11 of the base of the device. With the bending of the nozzle thus limited, the greater applied force causes maximum inward flexure of the top wall 15 which reduces the volume of the measuring chamber to a minimum and thereby forcibly ejects in a stream a predetermined portion of the liquid trapped in the volumetric measuring chamber. Since the measuring chamber is sealed off from the rest of the container by the top wall 15 in pressure contact with the sealing flange 25, the quantity of liquid dispensed is unaffected by the level of liquid within the container. Thus, application of the same amount of force will always result in dispensing the same amount of liquid. Upon release of the manually applied force, the nozzle will spring back to its normal configuration, as shown in FIG. 2, whereupon the liquid from the container will flow past the throat which is now open to again fill the volumetric measuring chamber to permit repeated actuation of the device to dispense another liquid stream of predetermined quantity if desired.

While there has been shown and described what is considered to be a preferred embodiment of the invention, it will of course be apparent that obvious changes could be made in the exact form herein shown and described without departing from the spirit of the invention. It is therefore intended that the invention be not limited to the exact form herein shown and described nor to anything less than the whole of the invention herein disclosed and as hereinafter claimed.

I claim:

1. A device for dispensing liquid in metered amounts from a liquid container, said device being formed of a resilient, semirigid material rendering the device flexible under manually applied force and comprising, an annular base adapted for liquid-tight sealing engagement with the finish of said container, the interior area of said base being in free communication with the interior area of said container, and an elongated nozzle supported on said base and defined by walls merging with the wall of said annular base, one of said nozzle walls being formed with a sharp curve providing a fixed flexure axis about which the entire outer end of said nozzle will yieldably bend relative to said base upon manual application of force thereto in a direction decreasing the radius of said sharp curve, the interior area of said nozzle being normally in free communication with the interior of said base, a portion of said nozzle interior area being sealed from said base interior area to constitute a volumetric measuring chamber when the nozzle is bent to bring opposed walls thereof into sealing contact in the area of said flexure axis, said nozzle portion being formed with a dispensing orifice of constant, predetermined dimension through which liquid from said nozzle portion is discharged by displacement thereof resulting from inward flexure of a nozzle wall in response to the same applied force acting to bend said nozzle relative to said base about said flexure axis.

2. The invention according to claim 1 wherein the longitudinal axis of said nozzle is inclined at an acute angle relative to the axis of said base.

3. The invention according to claim 1 wherein said one wall of said nozzle at said sharp curve is thinner than the opposite wall of said nozzle to induce the bending of said nozzle about said flexure axis prior to the inward flexure of said opposite wall upon manual application of force thereto.

4. The invention according to claim 1 wherein said one wall includes a laterally extending flange on the interior surface thereof adjacent said sharp curve to define with said opposite wall a constricted throat between the interior of said nozzle portion and the interior of said base.

5. A device for dispensing liquids in metered amounts from a liquid container, said device being formed of a resilient, semirigid material rendering the device flexible under manually applied force and comprising, an annular base adapted for liquid-tight sealing engagement with the finish of said container, said base including an annular wall the interior surface of which is shaped to fit in liquid-tight sealing engagement with the finish of said container, the interior area of said base being in free communication with the interior area of said container, and an elongated upstanding nozzle supported on said base and defined by top, bottom and side walls merging with the wall of said base, said nozzle including an end wall formed to provide a dispensing orifice of constant, predetermined dimension, said bottom nozzle wall being formed with a sharp curve providing a fixed flexure axis about which the entire outer end of said nozzle beyond said curve will yieldably bend relative to said base upon manual application of force on said top wall, the interior area of said nozzle being normally in free communication with the interior of said base, said communication being interrupted by the bending of said nozzle to the extent of bringing said top and bottom walls into sealing contact to thereby create a volumetric measuring chamber defined in part by said end wall, said top wall being inwardly flexed incident to the bending of said nozzle to displace liquid from said chamber through said orifice in amounts corresponding to the amount of force applied to said top wall.

6. The invention according to claim 5 wherein the size of said dispensing orifice is predetermined in accordance with the viscosity of said liquid to prevent gravity flow of liquid through the orifice in the absence of applied force sufficient to inwardly flex said top wall to displace liquid from said measuring chamber.

7. The invention according to claim 5 wherein said nozzle is responsive to a relatively light force applied on said top wall in excess of that required to bring said top and bottom walls into sealing contact to cause discharge of liquid from said measuring chamber in a drop-by-drop manner.

8. The invention according to claim 5 wherein said base constitutes a limit for the bending of said nozzle about said flexure axis, and wherein said nozzle is responsive to the application of force on said top wall sufficient to bend said nozzle into limiting engagement with said base and to inwardly flex said top wall the maximum extent to cause discharge of a predetermined amount of liquid from said chamber in a stream.

9. The invention according to claim 5 wherein the longitudinal axis of said nozzle is inclined at an acute angle relative to the axis of said base.

10. The invention according to claim 5 wherein said bottom wall of said nozzle at said sharp curve is thinner than said top wall to induce a bending of said nozzle about said flexure axis prior to the inward flexure of said top wall upon manual application of force thereto.

11. The invention according to claim 5 wherein said bottom wall includes a laterally extending flange on the interior surface thereof adjacent said sharp curve to define with said top wall a constricted throat whereat communication between the interior of said nozzle and said base is interrupted by the bending of said nozzle relative to said base.

12. A device for dispensing liquids in metered amounts from a liquid container, said device being formed of a resilient, semirigid material rendering the device flexible under manually applied force and comprising, a base adapted for attachment to the discharge opening of said container, said base including an annular wall the interior surface of which is shaped to engage in a liquid-tight seal with the finish of said container, the interior area of said base being in free communication with the interior area of said container, and an elongated upstanding nozzle supported on said base and defined by top, bottom and side walls merging with the wall of said base, said nozzle having a longitudinal axis inclined at an acute angle relative to the axis of said base and including an end wall formed to provide a dispensing orifice, said orifice being of a constant dimension predetermined in relation to the viscosity of said liquid to prevent gravity flow of liquid through the orifice in the absence of manually forced displacement of liquid from said nozzle, said bottom wall being formed with a sharp curve providing a fixed flexure axis about which said nozzle will yieldably bend inwardly relative to said base in response to manual application of force on said top wall, the interior area of said nozzle being normally in free communication with the interior of said base, said communication being interrupted by the bending of said nozzle to the extent of bringing said top and bottom walls into sealing contact to thereby create a volumetric measuring chamber defined in part by said end wall, said top wall being inwardly flexed incident to the bending of said nozzle to displace liquid from said chamber through said orifice in amounts corresponding to the amount of force applied to said top wall, said bottom wall at said sharp curve being thinner than said top wall to induce the bending of said nozzle about said flexure axis prior to the inward flexure of said top wall upon manual application of force thereto, said base serving as a limit to the bending of said nozzle about said flexure axis to facilitate the inward flexure of said top wall to the maximum extent.

References Cited by the Examiner

UNITED STATES PATENTS

| | | | |
|---|---|---|---|
| 2,609,972 | 9/1952 | Szekely | 222—207 X |
| 2,802,608 | 8/1957 | Gassaway | 222—541 X |
| 3,224,650 | 12/1965 | Willits | 222—540 X |

FOREIGN PATENTS 221,016  4/1962  Austria.

ROBERT B. REEVES, *Primary Examiner.*

N. L. STACK, *Assistant Examiner.*